(12) United States Patent
Morita et al.

(10) Patent No.: US 6,239,245 B1
(45) Date of Patent: May 29, 2001

(54) RESIN ADDITIVE, CURABLE RESIN COMPOSITION, AND CURED RESIN

(75) Inventors: Yoshitsugu Morita; Kazuo Kobayashi; Hiroshi Ueki; Haruhiko Furukawa, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/507,867

(22) Filed: Feb. 22, 2000

(30) Foreign Application Priority Data

Mar. 2, 1999 (JP) .................................................. 11-054139

(51) Int. Cl.$^7$ .................................................. C08G 77/08
(52) U.S. Cl. ............................. 528/15; 528/31; 525/431; 525/474; 525/476; 525/477; 524/538; 524/540; 524/588
(58) Field of Search ........................ 500/15, 31; 525/477, 525/431, 476, 474; 524/538, 540, 588

(56) References Cited

U.S. PATENT DOCUMENTS 5,492,945  *  2/1996  Morita et al. ......................... 523/212

FOREIGN PATENT DOCUMENTS

| 58-219218 | 12/1983 | (JP) . |
| 59-096122 | 1/1984 | (JP) . |
| 01004614 | 1/1989 | (JP) . |
| 01051465 | 2/1989 | (JP) . |

* cited by examiner

*Primary Examiner*—Margaret G. Moore
(74) *Attorney, Agent, or Firm*—James L. DeCesare

(57) ABSTRACT

There is provided (i) a resin additive able to impart superior thermal shock resistance even in the case of resins that have absorbed moisture, (ii) a curable resin composition capable of forming a cured resin that has superior thermal shock resistance even after absorbing moisture, and (iii) a cured resin that has superior thermal shock resistance even after absorbing moisture. The resin additive consists of a powder with a mean particle size of 0.1 to 100 $\mu$m of silicone rubber. It has a moisture absorption rate of 0.20 weight percent or less after being treated for 20 hours at a temperature of about 121° C., a pressure of two atmospheres, and a relative humidity of 100 percent. The curable resin composition contains the resin additive, and the cured resin is formed by curing the curable resin composition.

8 Claims, No Drawings

RESIN ADDITIVE, CURABLE RESIN COMPOSITION, AND CURED RESIN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to a resin additive that consists of a powdered silicone rubber, a curable resin composition that contains this powdered silicone rubber additive, and a cured resin that is obtained by curing the composition. More particularly, the invention is directed to a resin additive able to impart superior thermal shock resistance even in the case of resins that have absorbed moisture, a curable resin composition capable of forming a cured resin that has superior thermal shock resistance even after absorbing moisture, and a cured resin that has superior thermal shock resistance even after absorbing moisture.

BACKGROUND OF THE INVENTION

Numerous problems have been encountered by users of cured resins obtained by curing curable resin compositions, even though the electric characteristics such as the dielectric characteristic, the volume resistivity, and the insulation breakdown strength, as well as the mechanical characteristics such as bending strength, compressive strength, and impact strength, of such cured resins may be superior. For instance, when such resins are used as sealing agents for electric or electronic parts, repeated thermal shock results in the generation of gaps between the sealing resin and the part, or results in the generation of cracks in the sealing resin. This often occurs because the coefficient of thermal expansion of the resin is much greater than that of the electric or electronic part. Further, the part itself may be destroyed so that there occurs a conspicuous drop in the reliability of such parts.

Several solutions have been proposed for endowing cured resins with flexibility. In this regard, reference may be had to certain curable resin compositions of powder obtained by pulverizing silicone rubber containing linear organopolysiloxane blocks in the amount of 10 weight percent or greater, as in Japanese Patent Application Kokai No. Sho 58-219218; certain curable resin compositions of powdered silicone rubber which contain linear organopolysiloxane blocks in the amount of 10 weight percent or greater obtained by curing silicone rubber compositions in an aerosol state in a hot air draft, as in Japanese Patent Application Kokai No. Sho 59-96122; and certain curable resin compositions of powdered silicone rubber obtained by curing silicone rubber compositions in a disperse state in water, as in either Japanese Patent Application Kokai No. Sho 64-4614 or Japanese Patent Application Kokai No. Sho 64-51465.

However, even in these cases, the thermal shock resistance of resins obtained by curing the composition, has been insufficient, especially thermal shock resistance following the absorption of moisture.

BRIEF SUMMARY OF THE INVENTION

It is therefore an object of the invention to provide (i) a resin additive which is able to impart superior thermal shock resistance even in the case of resins that have absorbed moisture, (ii) a curable resin composition that is capable of forming a cured resin that has superior thermal shock resistance even after absorbing moisture, and (iii) a cured resin that has a superior thermal shock resistance even after absorbing moisture.

The resin additive is an additive powder with a mean particle size of 0.1 to 100 $\mu$m which has been prepared from a silicone rubber having a moisture absorption rate of 0.20 weight percent or less, after having been treated for 20 hours at a temperature of 121° C., a pressure of 2 atmospheres, and relative humidity of 100 percent. The curable resin composition is a composition that contains the resin additive, and the cured resin is a resin obtained by curing the curable resin composition.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The Resin Additive

The resin additive of the invention is characterized by the fact that the additive consists of a powder of a silicone rubber which has a moisture absorption rate, i.e., the weight increase rate, of 0.20 weight percent or less, after it has being treated for 20 hours in a pressure cooker test at a temperature of 121° C., a pressure of two atmospheres, and a relative humidity of 100 percent, and the mean particle size of the powder is 0.1 to 100 $\mu$m.

In particular, the resin additive has a small hygroscopicity compared to conventional resin additives consisting of powdered silicone rubbers. The difference in hygroscopicity between the resin additive of the invention and conventional resin additives is not conspicuous in the case of, for example, treatment for 20 hours at a temperature of 85° C. and relative humidity of 85 percent; however, the difference is very conspicuous in the pressure cooker test performed under the high temperature, high pressure conditions described above.

The mean particle sized of the powdered silicone rubber making up the resin additive of the invention is in the range of 0.1 to 100 $\mu$m, and is preferably in the range of 0.1 to 50 $\mu$m. These mean particle size ranges are preferred because on one hand it is difficult to manufacture a powdered silicone rubber whose mean particle size is smaller than the lower limit of these ranges; while on the other hand, a powdered silicone rubber whose mean particle size exceeds the upper limit of these ranges shows a poor dispersibility in resins, with the result that such powdered silicone rubbers cannot easily impart resins with sufficient flexibility and thermal shock resistance. While the shape of the particles of powdered silicone rubber may be spherical, flattened, or irregular, spherical particles are desirable, since spherical particles show better dispersibility in resins.

Some of the methods which can be used to manufacture the powdered silicone rubber include (1) a method in which a hydrosilation reaction curable silicone rubber composition is cured and then it is pulverized; (2) a method in which a hydrosilation reaction curable silicone rubber composition in an aerosol state is cured in air; and (3) a method in which a hydrosilation reaction curable silicone rubber composition in a dispersed state is cured in water. Method (3) is preferred since it allows the efficient formation of powdered silicone rubber with spherical particles. The hydrosilation reaction curable silicone rubber composition consist of at least (A) an organopolysiloxane which contains at least two alkenyl groups per molecule, (B) an organopolysiloxane which contains at least two hydrogen atoms bonded to silicon atoms per molecule, and (C) a platinum type catalyst.

Organopolysiloxane component (A) is an organopolysiloxane that contains at least two alkenyl groups per molecule. Examples of some alkenyl groups in component (A) include vinyl, allyl, butenyl, hexenyl, heptenyl, octenyl, nonenyl, and decenyl groups. Vinyl groups are preferred. Groups other than alkenyl groups can be bonded to silicon atoms in component (A) including alkyl groups such as methyl, ethyl, propyl, and butyl groups; cycloalkyl groups such as cyclopentyl and cyclohexyl groups; aryl groups such as phenyl, tolyl, and xylyl groups; aralkyl groups such as benzyl, phenethyl, and 3-phenylpropyl groups; and halogenated alkyl groups such as 3-chloropropyl and 3,3,3-trifluoropropyl groups. Methyl and phenyl groups are preferred. There are no restrictions on the molecular structure of component (A), as the structure may be linear, linear with partial branching, branched, cyclic, network in form, or combinations of these structures. However, to obtain superior mechanical characteristics in the powdered silicone rubber, it is desirable that at least a portion of the molecular structure be linear. When the resin additive consisting of the powdered silicone rubber is employed in a curable resin composition used for sealing electric or electronic parts, it is desirable that the organopolysiloxane of component (A) contain a low level of ionic impurities such as sodium and halogen. There are no restrictions on the viscosity of component (A). However, it is desirable that the viscosity be in the range of 10 to 100,000 mPa·s at 25° C. A viscosity in the range of 20 to 10,000 mPa·s at 25° C. is especially desirable.

Organopolysiloxane component (B) is an organopolysiloxane that contains at least two hydrogen atoms bonded to silicon atoms in each molecule. Groups other than hydrogen atoms that may be bonded to silicon atoms in component (B) include alkyl groups such as methyl, ethyl, propyl, and butyl groups; cycloalkyl groups such as cyclopentyl and cyclohexyl groups; aryl groups such as phenyl, tolyl, and xylyl groups; aralkyl groups such as benzyl, phenethyl, and 3-phenylpropyl groups; and halogenated alkyl groups such as 3-chloropropyl and 3,3,3-trifluoropropyl groups. Methyl and phenyl groups are preferred. There are no restrictions on the molecular structure of component (B), and its structure may be linear, linear with partial branching, branched, cyclic, in a network form, or combinations of such structures. If the resin additive is a powdered silicone rubber employed in a curable resin composition used for sealing of electric or electronic parts, it is desirable that organopolysiloxane component (B) contain a low level of ionic impurities such as sodium and halogen. While there are no restrictions on the viscosity of component (B), it is desirable that the viscosity be in the range of 1 to 10,000 mPa·s at 25° C.

Platinum catalyst component (C) is a catalyst typically used to cure compositions by promoting a hydrosilation reaction between alkenyl groups and hydrogen atoms bonded to silicon atoms in the composition. Some examples of catalysts that can be used include chloroplatinic acid, alcohol solutions of chloroplatinic acid, olefinic complexes of platinum, alkenylsiloxane complexes of platinum, platinum black, and platinum supported on silica. The amount of component (C) added to the composition is merely the amount sufficient to promote curing of the composition. For example, the weight of platinum metal atoms in component (C) can be in the range of 0.1 to 1,000 ppm per 100 parts by weight of the silicone components in the composition. Amounts in the range of 0.1 to 500 ppm are even more desirable, and amounts in the range of 1 to 50 ppm are especially desirable.

If desired, addition reaction inhibiting agents such as acetylene compounds, hydrazine compounds, triazole compounds, phosphine compounds, mercaptan compounds and amine compounds, may be added in small amounts to the composition to adjust the curing rate. In addition, fillers such as fumed silica may be added to adjust the fluidity or to improve the mechanical strength of the powdered silicone rubber.

The affinity of the powdered silicone rubber for the resin can be improved, and the adhesive properties of the powdered silicone rubber can be improved, by adding an organic compound containing two or more alkenyl groups per molecule such as 1,5-hexadiene, divinylbenzene, diallyl phthalate, or diallyl polyether. For these purposes, one can also use an organic compound that contains epoxy groups such as allyl glycidyl ether, vinylcyclohexene monoxide, glycidyl acrylate, or glycidyl methacrylate, as well as organic compounds that contains alkyl or aryl groups such as α-methylstyrene and 1-hexene. Organic oils such as mineral oil, fluorocarbon oils, nonreactive silicone oils, and silicone resins, may be added to lower the hygroscopicity of the powdered silicone rubber.

To form a powdered silicone rubber which has a moisture absorption rate of 0.20 weight percent or less after being treated for 20 hours at a temperature of 121° C., a pressure of two atmospheres, and relative humidity of 100 percent, it is desirable that the ratio between the total number of moles of hydrogen atoms bonded to silicon atoms to the total number of moles of alkenyl groups in the composition be in a range of about 0.5:1 to 20:1. If the ratio is less than 0.5:1, the silicone rubber composition tends to cure insufficiently. If the ratio exceeds 20:1, the moisture absorption rate of the silicone rubber increases.

Powdered silicone rubber with a mean particle size of 0.1 to 100 μm may be formed by a first method in which the silicone rubber composition consists of component (A), component (B), component (C), and optional components, and the silicone rubber composition is cured while dispersed in water. A second method can also be used in which the silicone rubber composition consists of only component (A), component (B), and optional components, but does not contain component (C). These components are dispersed in water, and after being dispersed in water, the composition is cured by adding component (C). The second method is especially desirable, since it is capable of preparing powdered silicone rubber having a smaller mean particle size and more uniform particle size distribution.

One method which can be used to disperse silicone rubber compositions containing component (C) or silicone rubber compositions not containing component (C) in water, involves mixing the composition with water or an aqueous solution of a surfactant, after which the composition is dispersed in water by means of an agitating device such as a homogenizer or colloid mill, or by means of a mixing device such as an ultrasonic vibrator. It is preferred to first prepare the mixture in an aqueous solution of surfactant, and then disperse the mixture in water by means of the agitating or mixing device, since such a method makes it possible to achieve a smaller mean particle size in the resulting powdered silicone rubber.

Some examples of surfactants that can be used include nonionic surfactants such as polyoxyalkylene alkyl ethers, polyoxyalkylene alkyl phenols, polyoxyalkylene alkyl esters, polyoxyalkylene sorbitan esters, polyethylene glycols, polypropylene glycols and ethylene oxide adducts of diethylene glycol trimethylnonanol; anionic surfactants such as hexylbenzenesulfonic acid, octylbenzenesulfonic acid, decylbenzenesulfonic acid, dodecylbenzenesulfonic acid, cetylbenzenesulfonic acid, myristylbenzenesulfonic acid, and their sodium salts; and cationic surfactants such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, dioctadecyldimethylammonium hydroxide, beef tallow trimethylammonium hydroxide, and coconut oil trimethylammonium hydroxide.

Combinations of two or more of these types of surfactants can also be used. In particular, the mean particle size of the powdered silicone rubber can be made even smaller, if at least two nonionic surfactants are used. In this case, one nonionic surfactant should have an HLB of less than 10, and the other nonionic surfactant should have an HLB of 10 or more, provided the difference between the HLBs of the two nonionic surfactants is at least five or more.

While there is no particular limit on the amount of surfactant that can be used, it is preferred that the amount be 0.01 to 20 parts by weight per 100 parts by weight of the silicone rubber composition. A most preferred amount is 0.05 to 5 parts by weight. If the amount of surfactant is less than the lower limit of the range, it becomes difficult to form a stable silicone rubber composition or aqueous dispersion of the silicone rubber composition. If the amount exceeds the upper limit of the range, there is a tendency for the electrical and mechanical characteristics of the powdered silicone rubber to deteriorate.

There is also no limit on the amount of water that can be added, but it is preferred that the amount be 15 to 2,000 parts by weight per 100 parts by weight of the silicone rubber composition. Most preferred is an amount in the range of 30 to 1,000 parts by weight. If the amount of water is less than the lower limit of the range, it becomes difficult to form a stable silicone rubber composition or aqueous dispersion of the silicone rubber composition. If the amount exceeds the upper limit of the range, the productivity of the powdered silicone rubber tends to decrease. The content of metal and halogen ions in the water should be small so that the electrical conductivity of the water is 1 mho/cm or less, and ion exchanged water with an electrical conductivity of 0.5 mho/cm is most preferred.

In the second method, when component (C) is added to an aqueous dispersion of the silicone rubber composition consisting of component (A), component (B), and optional components, it is preferred to use component (C) dispersed in an aqueous solution of one of the surfactants described above. In particular, ncomponent (C) should be dispersed in the form of liquid particles with a mean particle size of 1 $\mu$m or less based on the volume particle size distribution of component (C) in water. Preferably, component (C) is dispersed in the form of liquid particles with a mean particle size of 0.8 $\mu$m or less, and more preferably component (C) is dispersed in the form of liquid particles with a mean particle size of 0.5 $\mu$m or less. Regarding the volume particle size distribution of component (C) dispersed in the form of liquid particles in water, it is preferred that the amount of component (C) with a particle size of 1 $\mu$m or less, constitute 40 weight percent or more of the total amount.

To prepare aqueous dispersions of component (C), it is preferred to use a platinum alkenylsiloxane complex as the platinum catalyst used for the hydrosilation reaction of component (C). Some examples of platinum alkenylsiloxane catalysts which may be used include platinum 1,3-divinyl-1,1,3,3-tetramethyldisiloxane complexes, platinum 1,3-diallyl-1,1,3,3-tetramethyldisiloxane complexes, platinum 1,3-divinyl-1,3-dimethyl-1,3-diphenyldisiloxane complexes, platinum 1,3-divinyl-1,1,3,3-tetraphenyldisiloxane complexes, and platinum 1,3,5,7-tetramethyl-1,3,5,7-tetravinyl cyclotetrasiloxane complexes. To improve the stability of such platinum alkenylsiloxane complexes, an excess of 1,3-divinyl-1,1,3,3-tetramethyldisiloxane; 1,3-diallyl-1,1,3,3-tetramethyldisiloxane; 1,3-divinyl-1,3-dimethyl-1,3-diphenyldisiloxane; 1,3-divinyl-1,1,3,3-tetraphenyldisiloxane; or 1,3,5,7-tetramethyl-1,3,5,7-tetravinyl cyclotetrasiloxane, may be added to the complex.

When the aqueous dispersion of component (C) is prepared, a surfactant may be used to disperse component (C) in the form of liquid particles with a mean particle size of 1 $\mu$m or less based on the volume particle size distribution of component (C) in water. In this case, it is preferred that the amount of surfactant added be in the range of 0.01 to 1,000 parts by weight per 100 parts by weight of component (C). If component (C) is dissolved or dispersed beforehand in a water soluble organic solvent to achieve uniform dispersion of component (C) in water, and the organic solvent solution or dispersion is added to water, component (C) can be dispersed in the form of even smaller liquid particles. Some examples of suitable water soluble organic solvents which can be used include alcohols with four or less carbon atoms such as methanol, ethanol, n-propanol, isopropanol, and tert-butyl alcohol; and ketones such as acetone and methyl ethyl ketone. The lower alcohols are preferred. In one method used to prepare the aqueous dispersion of component (C), the dispersion can be mixed by means of an agitating or mixing device such as a colloid mill or homogenizer, using the same surfactants as described above.

Curing of the silicone rubber composition dispersed in water can be promoted by allowing an aqueous dispersion of the silicone rubber composition, or by allowing an aqueous dispersion of the silicone rubber composition prepared by adding component (C) to an aqueous dispersion of the silicone rubber composition excluding component (C), to stand at room temperature, or by heating the aqueous dispersion to a temperature of 100° C. or less, preferably 70° C. or less.

The powdered silicone rubber can be recovered by removing water from the aqueous dispersion of powdered silicone rubber obtained by curing the silicone rubber composition dispersed in water. Some methods which can be used to recover the powdered silicone rubber include methods in which the aqueous dispersion of powdered silicone rubber is heated and/or subjected to reduced pressure, and methods involving hot air draft drying or air blast drying. Removal of water can be facilitated by subjecting the aqueous dispersion to filtration or separation by centrifuging or salt deposition prior to its drying.

Resin additives of the invention provide resins with flexibility and thermal shock resistance. Accordingly, the resin additive is suitable for addition to thermosetting resins such as epoxy resins and phenol resins, and for addition to thermoplastic resins such as polyethylene resins, polypropylene resins, nylon resins, and polyester resins.

The Curable Resin Composition

The curable resin composition of the invention is a composition that contains the resin additive. While there are no restrictions on the content of the resin additive, it should be used in the range of 0.1 to 100 parts by weight per 100 parts by weight of curable resin. If the content of the resin additive is less than the lower limit of the range, the flexibility and thermal shock resistance of the resulting cured resin tend to deteriorate; in particular, thermal shock resistance following moisture absorption tends to deteriorate. If the content exceeds the upper limit of the range, the mechanical characteristics of the resulting cured resin tend to deteriorate.

Curable resin compositions of the invention are curable resins which include as the main component of the composition resins such as phenol resins, formaldehyde resins, xylene resins, xylene formaldehyde resins, ketone formaldehyde resins, furan resins, urea resins, imide resins, melamine resins, alkyd resins, unsaturated polyester resins, aniline resins, sulfonamide resins, silicone resins, epoxy resins, and resins obtained by copolymerizing any of these resins.

The curable resin may be used as a combination consisting of two or more resins. In this regard, the curable resin should be at least one resin selected from the group consisting of epoxy resins, phenol resins, imide resins, and silicone resins.

The epoxy resin may be any compound containing glycidyl groups or alicyclic epoxy groups. Some examples of epoxy resins include o-cresol novolak type epoxy resins, biphenyl type epoxy resins, bisphenol A type epoxy resins, bisphenol F type epoxy resins, dicyclopentadiene type epoxy resins, naphthalene type epoxy resins, anthracene type epoxy resins, naphthol aralkyl type epoxy resins, polyvinylphenol type epoxy resins, diphenylmethane type epoxy resins, diphenylsulfone type epoxy resins, triphenol alkane type epoxy resins, cresol naphthol cocondensate type epoxy resins, bisphenylethylene type epoxy resins, fluorene type epoxy resins, stilbene type epoxy resins, spirocoumarone type epoxy resins, norbornene type epoxy resins, terpene type epoxy resins, phenol cyclohexane type epoxy resins, halogenated epoxy resins, imido group containing epoxy resins, maleimido group containing epoxy resins, allyl group containing epoxy resins, and silicone modified epoxy resins.

Some examples of phenol resins which can be used include polyvinylphenol type resins, phenol novolak type resins, naphthol type resins, terpene type resins, phenol dicyclopentadiene type resins, phenol aralkyl type resins, naphthol aralkyl type resins, triphenol alkane type resins, dicyclopentadiene type resins, cresol naphthol cocondensate type resins, and xylene naphthol cocondensate type phenol resins.

Some examples of silicone resins which can be used include epoxy modified silicone resins obtained by the reaction of epoxy resins with the silanol or alkoxy groups bonded to silicon atoms in a silicone resin.

The curing mechanism for such curable resins may be thermal curing mechanism, high energy radiation curing mechanism using ultraviolet light or radiation, a moisture curing mechanism, a condensation reaction curing mechanism or an addition reaction curing mechanism.

There are no restrictions on the properties of the curable resin at 25° C., and the resin may be a liquid resin or a solid resin that can be softened by heat. Curing agents, curing accelerators, fillers, photosensitizing agents, metal salts of fatty acids, ester type waxes such as Carnauba wax, and plasticizers, may be added to the curable resin composition of the invention as an optional component.

Some examples of curing agents that can be used include organic acids such as carboxylic acids, sulfonic acids, and their anhydrides; organic hydroxy compounds; organosilicon compounds containing silanol groups, alkoxy groups, or halogen groups, such as 3-glycidoxypropyltrimethoxysilane; and primary or secondary amino compounds. Such compounds may be used in combinations consisting of two or more of the compounds.

Some examples of curing accelerators that can be used include tertiary amine compounds; organometallic compounds containing aluminum or zirconium such as aluminum acetylacetate and aluminum benzoate; organophosphorus compounds such as phosphine and triphenylphosphine; heterocyclic amine compounds such as hexamethylenetetramine; boron complex compounds; organic ammonium salts; organic sulfonium salts; organic peroxides; and hydrosilation catalysts.

Some examples of fillers that can be used include (i) fiber type fillers such as glass fibers, asbestos fibers, alumina fibers, ceramic fibers containing alumina and silica as a component, boron fibers, zirconium fibers, silicon carbide fibers, metal fibers, polyester fibers, aramide fibers, nylon fibers, phenol fibers, natural animal, and vegetable fibers; and (ii) powder type fillers such as fused silica (quartz), precipitated silica, fumed silica, calcined silica, lead oxide, calcined clay, carbon black, glass beads, alumina, talc, calcium carbonate, clay, aluminum hydroxide, barium sulfate, titanium dioxide, aluminum nitride, silicon carbide, magnesium oxide, beryllium oxide, kaolin, mica, and zirconia. The filler may be used as a combination consisting of two or more of such fillers.

One example of a procedure which can be used to prepare the curable resin composition of the invention is a method in which the curable resin, the resin additive, and any optional components, are mixed with a kneading apparatus such as a ball mill, Henschel mixer, agitating mill, Ross mixer, planetary mixer, double roll, triple roll, or a mixing and grinding machine. An organic solvent may be used in the preparation of the curable resin composition. Some examples of organic solvents that can be used include aromatic organic solvents such as toluene and xylene, and aliphatic hydrocarbon type organic solvents such as hexane and heptane.

In preparing curable resin compositions of the invention, the kneading process should be performed at a temperature ranging from about room temperature to about 95° C. If desired, the curable resin composition can be pulverized after the curable resin composition has been prepared.

The particular method used to form the cured resin by means of the curable resin composition of the invention will vary according to the curing mechanism of the curable resin involved. Some procedures which can be used include methods in which the curable resin composition is cured at room temperature or by heating, methods in which the curable resin composition is irradiated with ultraviolet light, and methods in which the curable resin composition is allowed to stand in the presence of moisture. Procedures which can be used to form a cured resin from a thermosetting type curable resin composition include transfer molding, injection molding, and casting. In this case, the curing temperature of the curable resin composition should be in the range of 100 to 300° C. Following cure, it may be desirable to perform additional postcuring at a temperature in the range of 100 to 300° C.

The curable resin composition of the invention has superior fluidity and moldability prior to curing, and when the composition is cured, it is capable of forming a cured resin that has flexibility and thermal shock resistance.

Accordingly, the composition can be used as a sealing agent for electrical and electronic parts such as integrated circuits, large scale integrated circuits, transistors, and diodes. In particular, the composition is capable of forming a cured resin that has a superior thermal shock resistance even after absorbing moisture, and accordingly, the composition is ideal as a sealing agent for highly integrated electronic parts.

The Cured Resin

The cured resin of the invention is obtained by curing the curable resin composition described above. Such cured resins have superior thermal shock resistance even after absorbing moisture, and can be used as cured resins to seal electrical and electronic parts such as integrated circuits, large scale integrated circuits, transistors, and diodes. In particular, these resins are ideal as cured resins for sealing highly integrated electronic parts.

Working Examples

The resin additive, the curable resin composition, and the cured resin of the invention will be described in detail in the following working examples. Viscosity values used in these working examples are the values measured at 25° C.

Some of the characteristics of the resin additive and the cured resin were determined by procedures explained below.

Characteristics of the Resin Additive—Hardness

The silicone rubber composition used to form the powdered silicone rubber was cured by being allowed to stand for one day at room temperature, thus producing a silicone rubber sheet. The hardness of the silicone rubber sheet was measured using a type A durometer according to the procedure outlined in Japanese Industrial Standard JIS K 6253.

Moisture Absorption Rate

A silicone rubber sheet having dimensions of about 10 mm×about 20 mm×about 2 mm prepared by the method described above, was placed in a pressure resistant vessel with an internal capacity of 75 ml. The inside surface of the vessel was made of a fluoro type resin and the outside surface of the vessel was made of stainless steel. 50 ml of ion exchange water with an electrical conductivity of 0.4 mho/cm was added, and the vessel was tightly closed with the silicone rubber sheet in an immersed state. The sample was heated for 20 hours at a temperature of 121° C., a pressure of two atmospheres, and a relative humidity of 100 percent. The sample was cooled to room temperature, the moisture adhering to the surface of the silicone rubber sheet was wiped away, and the rate of increase in the weight of the sample was measured. This measured value was used as the moisture absorption rate of the silicone rubber expressed in terms of weight percent.

Mean Particle Size

The silicone rubber composition was dispersed in water, and an aqueous suspension of powdered silicone rubber was obtained by curing this composition. It was measured by means of a laser diffraction type particle size distribution measuring device, Model LA-500 manufactured by Horiba Seisakusho. A median particle size was obtained corresponding to 50 percent of the cumulative distribution. This median particle size was used as the mean particle size.

Characteristics of the Cured Resin—Thermal Shock Resistance

Twenty (20) resin sealed semiconductor devices were manufactured by using the curable resin composition to seal semiconductor elements having a device size of 36 mm$^2$ and a package thickness of 2.0 mm. These twenty semiconductor devices were subjected to 150 cycles of a thermal shock test for semiconductor devices, in which an operation switched from −196 ° C. to +150° C. in the space of one minute is considered one cycle. The surfaces of these semiconductor devices were then examined using a stereoscopic microscope, and the number of semiconductor devices showing cracks in their surface was determined. The thermal shock resistance was evaluated by assigning a grade of "○" in cases where the number was 5 or less, a grade of "Δ" in cases where the number was 6 to 10, and a grade of "×" in cases where the number was 11 or more.

Preparation of A Powdered Silicone Rubber 100 parts by weight of a silicone rubber composition was prepared by combining a dimethylpolysiloxane methylvinylsiloxane copolymer and a dimethylsiloxane methylhydridosiloxane copolymer, which were rapidly mixed with 40 parts by weight of a 1.65 weight percent aqueous solution of polyoxyethylene (9 moles) nonylphenyl ether nonionic surfactant. This mixture was passed through a colloid mill, and then it was added to 100 parts by weight of pure water, to produce a uniform aqueous dispersion of silicone rubber composition.

The dimethylpolysiloxane methylvinylsiloxane copolymer had a viscosity of 400 mPa·s. Each end of its molecular chain were terminated with dimethylvinylsiloxy groups in which the vinyl group equivalent was 5,750, the sodium ion concentration was equal to or less than about 2 ppm, and the halogen ion concentration was equal to or less than about 5 ppm. The dimethylsiloxane methylhydridosiloxane copolymer had a viscosity of 20 mPa·s. Each end of its molecular chain were terminated with trimethylsiloxy groups in which the equivalents of hydrogen atoms bonded to silicon atoms was 320, the sodium ion concentration was equal to or less than about 2 ppm, and the halogen ion concentration was equal to or less than about 5 ppm. The ratio (H/Vi) of the total number of moles of hydrogen atoms bonded to silicon atoms to the total number of moles of vinyl groups in the resulting silicon rubber composition is shown in Table 1.

A separately prepared aqueous emulsion of a platinum type catalyst was mixed with the aqueous emulsion of the silicone rubber composition, so that the amount of platinum metal relative to the total amount of the silicone component in the resulting emulsion was 20 ppm. This produced an aqueous emulsion of silicone rubber composition. The aqueous emulsion of platinum type catalyst consisted of a 1,1-divinyl-1,1,3,3-tetramethoxydisiloxane complex of platinum, in which the mean particle size of the platinum catalyst was about 0.05 μm, and the platinum metal concentration was about 0.05 weight percent.

200 parts by weight of pure water at a temperature of 25° C. and having an electrical conductivity of 0.2 mho/cm, and 4 parts by weight of polyoxyethylene nonylphenyl ether nonionic surfactant with an HLB of 13.1, were rapidly mixed with the aqueous emulsion. The mixture was passed twice through a colloid mill, producing a uniform aqueous dispersion of a silicone rubber composition. The aqueous dispersion of silicone rubber composition was allowed to stand for 6 hours at 30° C., so that the silicone rubber composition dispersed in the water was cured, producing an aqueous dispersion of powdered silicone rubber.

The aqueous dispersion of powdered silicone rubber was dried by being sprayed in a hot air draft at 300° C., producing a powdered silicone rubber with a spherical particle shape and having a mean particle size of 3 μm. The characteristics of the powdered silicone rubber are shown in Table 1.

TABLE 1

| Powdered Silicone Rubber | A | B | C | D | E |
|---|---|---|---|---|---|
| H/Vi in Silicone Rubber Composition | 0.95 | 0.98 | 1.05 | 1.50 | 2.0 |
| Hardness | 28 | 28 | 29 | 31 | 31 |
| Moisture Absorption Rate, weight percent | 0.07 | 0.09 | 0.12 | 0.22 | 0.29 |
| Mean Particle Size, $\mu$m | 3 | 3 | 3 | 3 | 3 |

Preparation of Another Powdered Silicone Rubber 100 parts by weight of a silicone rubber composition was prepared by combining a dimethylpolysiloxane methylvinylsiloxane copolymer and a dimethylsiloxane methylhydridosiloxane copolymer, which were rapidly mixed with 40 parts by weight of a 1.65 weight percent aqueous solution of polyoxyethylene (9 moles) nonylphenyl ether nonionic surfactant. This mixture was passed through a colloid mill, and then it was added to 100 parts by weight of pure water, to produce a uniform aqueous dispersion of silicone rubber composition.

The dimethylpolysiloxane methylvinylsiloxane copolymer had a viscosity of 400 mPa·s. Each end of its molecular chain were terminated with dimethylvinylsiloxy groups in which the vinyl group equivalent was 2,290, the sodium ion concentration was equal to or less than about 2 ppm, and the halogen ion concentration was equal to or less than about 5 ppm. The dimethylsiloxane methylhydridosiloxane copolymer had a viscosity of 50 mPa·s. Each end of its molecular chain were terminated with trimethylsiloxy groups in which the equivalents of hydrogen atoms bonded to silicon atoms was 230, the sodium ion concentration was equal to or less than about 2 ppm, and the halogen ion concentration was equal to or less than about 5 ppm. The ratio (H/Vi) of the total number of moles of hydrogen atoms bonded to silicon atoms to the total number of moles of vinyl groups in the resulting silicon rubber composition is shown in Table 2.

A separately prepared aqueous emulsion of a platinum type catalyst was mixed with the aqueous emulsion of the silicone rubber composition, so that the amount of platinum metal relative to the total amount of the silicone component in the resulting emulsion was 20 ppm. This produced an aqueous emulsion of silicone rubber composition. The aqueous emulsion of platinum type catalyst consisted of a 1,1-divinyl-1,1,3,3-tetramethoxydisiloxane complex of platinum, in which the mean particle size of the platinum catalyst was about 0.05 $\mu$m, and the platinum metal concentration was about 0.05 weight percent.

200 parts by weight of pure water at a temperature of 25° C. and having an electrical conductivity of 0.2 mho/cm, and 4 parts by weight of polyoxyethylene nonylphenyl ether nonionic surfactant with an HLB of 13.1, were rapidly mixed with the aqueous emulsion. The mixture was passed twice through a colloid mill, producing a uniform aqueous dispersion of a silicone rubber composition. The aqueous dispersion of silicone rubber composition was allowed to stand for 6 hours at 30° C., so that the silicone rubber composition dispersed in the water was cured, producing an aqueous dispersion of powdered silicone rubber.

The aqueous dispersion of powdered silicone rubber was dried by being sprayed in a hot air draft at 300° C., producing a powdered silicone rubber with a spherical particle shape and having a mean particle size of 3 $\mu$m. The characteristics of the powdered silicone rubber are shown in Table 2.

TABLE 2

| Type of Powdered Silicone Rubber | F | G |
|---|---|---|
| H/Vi in Silicone Rubber Composition | 0.95 | 2.0 |
| Hardness | 60 | 61 |
| Moisture Absorption Rate, weight percent | 0.06 | 0.31 |
| Mean Particle Size, $\mu$m | 3 | 3 |

WORKING EXAMPLE 1 AND COMPARATIVE EXAMPLES 1 AND 2

In these examples, a phenol novolak resin with a softening point of 80° C. and having an hydroxy group equivalent of 100 was used as the curable resin. Hexamethylenetetramine was used as the curing agent. Powdered silicone rubbers A, D, or none, were used as resin additive. Powdered fused quartz, 3-glycidoxypropyltrimethoxysilane, and carnauba wax, were used as optional components. These ingredients were uniformly mixed in the proportions shown in Table 3. The resulting mixtures were kneaded using heated rolls at 90° C. to produce three types of curable resin compositions. These curable resin compositions were then pulverized, transfer molded for three minutes at a temperature of 175° C. and pressure of 70 kgf/cm², and subjected to post curing for two hours at 150° C. The resulting three types of cured resins and their characteristics are shown in Table 3. In Tables 3–6, WE represents the Working Example(s) and CE represents the Comparative Example(s).

TABLE 3

| Component, Parts by Weight | WE 1 | CE 1 | CE 2 |
|---|---|---|---|
| Phenol Novolak Resin | 100 | 100 | 100 |
| Hexamethylenetetramine | 11.4 | 11.4 | 11.4 |
| Powdered Silicone Rubber A | 20 | — | — |
| Powdered Silicone Rubber D | — | 20 | — |
| Powdered Fused Quartz | 185.7 | 185.7 | 185.7 |
| 3-Glycidoxypropyl trimethoxysilane | 1.0 | 1.0 | 1.0 |
| Carnauba Wax | 2.9 | 2.9 | 2.9 |
| Thermal Shock Resistance | O | O | x |
| Thermal Shock Resistance after Moisture Absorption | O | x | x |

WORKING EXAMPLES 2–4 AND COMPARARIVE EXAMPLES 3 AND 4

In these examples, an epoxy modified silicone resin was used as the curable resin. It was obtained by reacting 50 parts by weight of a silicone resin and 50 parts by weight of an o-cresol novolak type epoxy resin. The silicone resin consisted of 40 mol percent $CH_3SiO_{3/2}$ units, 10 mol percent $C_6H_5(CH_3)SiO_{2/2}$ units, 40 mol percent $C_6H_5SiO_{3/2}$ units, and 10 mol percent $(C_6H_5)_2SiO_{2/2}$ units. The silicone resin contained 5 weight percent of hydroxy groups bonded to silicon atoms. The o-cresol novolak type epoxy resin had a softening point of 60° C. and an epoxy equivalent of about 220. Aluminum acetylacetate was used as the curing accelerator. Powdered silicone rubbers A, B, C, D, or none, were used as the resin additive. Optional components were powdered fused quartz, 3-glycidoxypropyltrimethoxysilane, and carnauba wax. These ingredients were uniformly mixed in the proportions shown in Table 4. The mixtures were further kneaded using heated rolls at 90° C. to produce five types of curable resin compositions. These five curable resin compositions were pulverized, transfer molded for three minutes at a temperature of 175° C. and a pressure of 70 kgf/cm², and then subjected to post curing for 12 hours at 180° C. The resulting five types of cured resins and their characteristics are shown in Table 4.

TABLE 4

| Component, Parts by Weight | WE 2 | WE 3 | WE 4 | CE 3 | CE 4 |
|---|---|---|---|---|---|
| Epoxy-Modified Silicone Resin | 100 | 100 | 100 | 100 | 100 |
| Aluminum Acetylacetate | 3.5 | 3.5 | 3.5 | 3.5 | 3.5 |
| Powdered Silicone Rubber A | 15 | — | — | — | — |
| Powdered Silicone Rubber B | — | 15 | — | — | — |
| Powdered Silicone Rubber C | — | — | 15 | — | — |
| Powdered Silicbne Rubber D | — | — | — | 15 | — |
| Powdered Fused Quartz | 284.6 | 284.6 | 284.6 | 294.6 | 284.6 |
| 3-Glycidoxypropyl trimethoxysilane | 1.0 | 1.0 | 1.0 | 1.0 | 1.0 |
| Carnauba wax | 3.8 | 3.8 | 3.8 | 3.8 | 3.8 |
| Thermal Shock Resistance | O | O | O | O | x |
| Thermal Shock Resistance after Moisture Absorption | O | O | O | x | x |

WORKING EXAMPLE 5 AND COMPARATIVE EXAMPLES 5 AND 6

In these examples, a bismaleimide triazine type thermosetting polyimide resin was used as the curable resin. The curing accelerator was aluminum benzoate. Powdered silicone rubbers A, E, or none, were used as the resin additive. The optional components were powdered fused quartz, 3-glycidoxypropyltrimethoxysilane, and carnauba wax. These ingredients were uniformly mixed in proportions shown in Table 5. The mixtures were kneaded using heated rolls at 90° C., and three types of curable resin compositions were prepared. The three curable resin compositions were then pulverized, transfer molded for four minutes at a temperature of 220° C. and pressure of 70 kgf/cm$^2$, and subjected to post curing for 3 hours at 230° C. This procedure resulted in three types of cured resins, and their characteristics are shown in Table 5.

TABLE 5

| Component, Parts by Weight | WE 5 | CE 5 | CE 6 |
|---|---|---|---|
| Bismaleimide Triazine type Polyimide Resin | 100 | 100 | 100 |
| Aluminum Benzoate | 1.0 | 1.0 | 1.0 |
| Powdered Silicone Rubber A | 23 | — | — |
| Powdered Silicone Rubber E | — | 23 | — |
| Powdered Fused Quartz | 233 | 233 | 233 |
| 3-Glycidoxypropyl trimethoxysilane | 2.0 | 2.0 | 2.0 |
| Carnauba Wax | 3.3 | 3.3 | 3.3 |
| Thermal Shock Resistance | O | O | x |
| Thermal Shock Resistance after Moisture Absorption | O | x | x |

WORKING EXAMPLES 6 and 7 AND COMPARATIVE EXAMPLES 7–9

In these examples, several curable resins were used including (i) an o-cresol novolak type epoxy resin with a softening point of 80° C. and having an epoxy equivalent of about 220; (ii) a biphenyl type epoxy resin YX-4000H manufactured by Petrochemical Shell Company with an epoxy equivalent of about 195; and (iii) a dicyclopentadiene type epoxy resin HP-7200H manufactured by Dai Nippon Inki Kagaku Kogyo K.K. with an epoxy equivalent of about 283. A phenol novolak resin was used as the curing agent. The curing accelerator was triphenylphosphine. Powdered silicone rubbers A, E, F, G, or none, were used as the resin additive. The optional components were powdered fused silica and carnauba wax. These ingredients were uniformly mixed in the proportions shown in Table 6. The mixtures were kneaded using heated rolls at 90° C. and five types of curable resin compositions were prepared. These five curable resin compositions were then pulverized, transfer molded for three minutes at a temperature of 150° C. and pressure of 70 kgf/cm$^2$, and subjected to post curing for four hours at 180° C. The resulting five types of cured resins and their characteristics are shown in Table 6.

TABLE 6

| Component, Parts by Weight | WE 6 | WE 7 | CE 7 | CE 8 | CE 9 |
|---|---|---|---|---|---|
| o-Cresol Novolak Epoxy Resin | 40 | 40 | 40 | 40 | 40 |
| Biphenyl Epoxy Resin | 20 | 20 | 20 | 20 | 20 |
| Dicyclopentadiene Epoxy Resin | 15 | 15 | 15 | 15 | 15 |
| Phenol Novolak Resin | 35 | 35 | 35 | 35 | 35 |
| Triphenylphosphine | 0.6 | 0.6 | 0.6 | 0.6 | 0.6 |
| Powdered Silicone Rubber A | 20 | — | — | — | — |
| Powdered Silicone Rubber F | — | 20 | — | — | — |
| Powdered Silicone Rubber E | — | — | 20 | — | — |
| Powdered Silicone Rubber G | — | — | — | 20 | — |
| Powdered Fused Silica | 310 | 310 | 310 | 310 | 310 |
| Carnauba Wax | 1 | 1 | 1 | 1 | 1 |
| Thermal Shock Resistance | O | O | O | O | x |
| Thermal Shock Resistance after Moisture Absorption | O | O | x | x | x |

The resin additive of this invention is an additive capable of imparting superior thermal shock resistance even in the case of resins that have absorbed moisture. The curable resin composition of this invention is a composition capable of forming a cured resin that has superior thermal shock resistance even after absorbing moisture. The cured resin of this invention is a resin with superior thermal shock resistance even after absorbing moisture.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A resin additive comprising a powder having a mean particle size of 0.1 to 100 μm, the powder being a silicone rubber which in sheet form has a moisture absorption rate of about 0.20 weight percent or less after the silicone rubber powder in sheet form has been treated for about 20 hours at a temperature of at least about 121° C., a pressure of at least about two atmospheres, and a relative humidity of about 100 percent.

2. A resin additive according to claim 1 wherein the silicone rubber powder is obtained by curing a hydrosilation reaction curing silicone rubber composition.

3. A resin additive according to claim 2 wherein the molar ratio between the total number of hydrogen atoms which are bonded to the silicon atoms to the total number of alkenyl groups present in the silicone rubber composition is in the range of 0.5:1 to 20:1.

4. A curable resin composition comprising the resin additive of claim 1 and at least one resin selected from the group consisting of epoxy resins, phenol resins, polyimide resins, and silicone resins.

5. A curable resin composition according to claim 4 in which the curable resin composition contains 0.1 to 100 parts by weight of the resin additive per 100 parts by weight of the resin.

6. An electrical or electronic part containing a sealing agent prepared from the curable resin composition of claim 5.

7. A cured resin comprising a resin obtained by curing the curable resin composition of claim 5.

8. A composition comprising (i) a resin additive comprising a powder having a mean particle size of 0.1 to 100 μm, the powder being a silicone rubber which in sheet form has a moisture absorption rate of about 0.20 weight percent or less after the silicone rubber powder in sheet form has been treated for about 20 hours at a temperature of at least about 121° C., a pressure of at least about two atmospheres, and a relative humidity of about 100 percent; (ii) at least one resin selected from the group consisting of epoxy resins, phenol resins, polyimide resins, and silicone resins; (iii) a filler; (iv) a wax; and (v) a curing agent or curing accelerator.

* * * * *